United States Patent
Mak et al.

(10) Patent No.: US 11,880,128 B2
(45) Date of Patent: Jan. 23, 2024

(54) NON-SENSOR TYPE CLOSED-LOOP STABILIZATION CONTROL ALGORITHM AND APPLICATION CIRCUIT THEREOF

(71) Applicant: Vista Innotech Limited, Hong Kong (CN)

(72) Inventors: Lin Chi Mak, Hong Kong (CN); Yee Chung Chu, Hong Kong (CN)

(73) Assignee: VISTA INNOTECH LIMITED, Hongkong (CN)

( * ) Notice: Subject to any disclaimer, the term of this patent is extended or adjusted under 35 U.S.C. 154(b) by 0 days.

(21) Appl. No.: 17/835,224

(22) Filed: Jun. 8, 2022

(65) Prior Publication Data

US 2023/0035757 A1 Feb. 2, 2023

(30) Foreign Application Priority Data

Jul. 27, 2021 (CN) .......................... 202110852608.7

(51) Int. Cl.
*H02P 25/034* (2016.01)
*G03B 5/00* (2021.01)
(Continued)

(52) U.S. Cl.
CPC ............. *G03B 5/00* (2013.01); *G02B 27/646* (2013.01); *H02P 23/0004* (2013.01); *G03B 2205/0007* (2013.01)

(58) Field of Classification Search
CPC .... H02P 25/034; H02P 23/0004; H02P 23/14; G02B 27/646; G03B 5/00; G03B 2205/0007; G03B 2217/005
See application file for complete search history.

(56) References Cited

U.S. PATENT DOCUMENTS 9,240,749 B2 * 1/2016 Green ................... H02P 27/085
11,039,071 B2 * 6/2021 Min ........................ H04N 23/57
(Continued)

FOREIGN PATENT DOCUMENTS

| CN | 102749697 B | 10/2012 |
| CN | 102798959 B | 11/2012 |

(Continued)

*Primary Examiner* — Kawing Chan
*Assistant Examiner* — Gabriel Agared
(74) *Attorney, Agent, or Firm* — MUNCY, GEISSLER, OLDS & LOWE, PC

(57) ABSTRACT

A non-sensor type closed-loop stabilization control algorithm comprises the following steps: 1, reading all voltages $V_{k-1}$ and currents $I_{k-1}$ for driving a multi-axis stabilization motor; 2, calculating and outputting all coil resistances $R_{k-1}$ in the multi-axis stabilization motor; 3, reading all the coil resistances, voltages and currents in the steps 1 and 2, and calculating and outputting counter electromotive force $E_{k-1}$ of all the coils in the multi-axis stabilization motor; 4, reading an stabilization compensation angle $\theta_k$, each coil resistance and the counter electromotive force, and calculating and outputting a closed-loop stabilization control $F_k$; and 5, then waiting for a time step k=k+1, and repeating the steps in the steps 1 to 4. It aims to add a closed-loop control element to a motor without a sensor to achieve an excellent stabilization effect and to reduce the risk of image blurring caused by resonance.

9 Claims, 5 Drawing Sheets

(51) Int. Cl.
    *G02B 27/64*     (2006.01)
    *H02P 23/00*     (2016.01)

(56) References Cited

U.S. PATENT DOCUMENTS

| | | | | |
|---|---|---|---|---|
| 2016/0175091 | A1* | 6/2016 | Van Heugten | A61F 2/14 |
| | | | | 623/6.22 |
| 2018/0316296 | A1* | 11/2018 | Hajati | H02P 6/16 |
| 2019/0103829 | A1* | 4/2019 | Vasudevan | H02P 23/12 |
| 2019/0132532 | A1* | 5/2019 | Tabuchi | H04N 25/61 |
| 2020/0192115 | A1* | 6/2020 | Abe | G02B 7/09 |
| 2021/0169417 | A1* | 6/2021 | Burton | A61B 5/4857 |

FOREIGN PATENT DOCUMENTS

| | | |
|---|---|---|
| CN | 107340667 B | 11/2017 |
| CN | 110892704 A | 3/2020 |
| WO | WO2020173393 A1 | 3/2020 |
| WO | WO2020215361 A1 | 10/2020 |

\* cited by examiner

NON-SENSOR TYPE CLOSED-LOOP STABILIZATION CONTROL ALGORITHM AND APPLICATION CIRCUIT THEREOF

FIELD OF TECHNOLOGY

The present disclosure relates to a stabilization control algorithm and an application circuit thereof, and particularly to a non-sensor type closed-loop stabilization control algorithm and an application thereof.

BACKGROUND

In recent years, compact mobile devices with shooting function are widely used, and scope of application is also continuously expanded, including smart phones, smart glasses, motion cameras, law enforcement recorders, and automobile data recorders. The device comprises at least one of a zoom compact camera module, an auto-focus compact camera module, or a fixed-focus compact camera module. Therefore, the market for these modules is big and growth is steadily increasing.

When taking photos and videos, the photos and videos photographed by the device are likely to be blurred or shaken due to external vibrations, affecting the quality of the photos and videos. This problem is more serious when the vibration is more intense, or in low-light situations.

To solve the problems, many different stabilization technologies have appeared on the market. In an existing mainstream technology, a vibration waveform and a required compensation angle are calculated by reading a vibration sensor (such as a gyroscope and an acceleration sensor), and the image blurring and shaking caused by the vibration are compensated by driving and controlling an optical image stabilizer (OIS), a sensor-shift stabilizer (SSS) and a gimbal stabilizer (GS) motor, thus improving the image quality effect.

In the first type of stabilization control mode (referring to the patent CN102749697B and CN110892704A), a sensor type closed-loop stabilization control algorithm and a circuit are employed, and a position sensor (such as a Hall sensor) needs to be added in a motor. According to the algorithm and the circuit, a closed-loop stabilization control is conducted by reading the position sensor to achieve an excellent stabilization effect and reduce the chance of resonance of the stabilization motor caused by external vibration and the risk of image blurring caused by resonance.

In the second type of stabilization control mode (referring to the patents CN102798959B and CN107340667B), an open-loop stabilization control algorithm and a circuit are employed, there is no need to add a position sensor in a motor, the stabilization motor and the camera module are simplified, and the size and cost of the motor and the module are reduced.

SUMMARY

An objective of the present invention is to solve the existing problems:

1, in the first type of stabilization control mode, a position sensor and additional pins need to be added in the motor, which makes the stabilization motor and module driving circuit and chip more complex, and improves the size and cost of the motor and the module; and 2, in the second type of stabilization control mode, as the open-loop control is employed, the stabilization motor is prone to resonance or unwanted motion due to external vibration, and the risk of image blurring caused by the resonance or motion is increased. A non-sensor type closed-loop stabilization control algorithm and an application circuit thereof are provided, through which a good stabilization control and stabilization effect can be achieved without adding an additional sensor in a motor, the risk of image blurring caused by resonance without adding an additional sensor in the motor, the stabilization motor and the camera module are simplified, and the size and cost of the motor and the module are reduced.

A non-sensor type closed-loop stabilization control algorithm, wherein the algorithm comprises the following steps:

1.1, reading all voltages $V_{k-1}$ and currents $I_{k-1}$ for driving a multi-axis stabilization motor through a resistance calculation module;

1.2, calculating and outputting all coil resistances $R_{k-1}$ in the multi-axis stabilization motor through the step 1.1;

1.3, reading all the resistors, voltages and currents in the steps 1.1 and 1.2 through a counter electromotive force calculation module, and calculating and outputting counter electromotive force $E_{k-1}$ of all the coils in the multi-axis stabilization motor;

1.4, reading a stabilization compensation angle $\theta_k$, each coil resistance and the counter electromotive force through a closed-loop stabilization control module, and calculating and outputting a closed-loop stabilization control $F_k$; and 1.5, then waiting for a time step k=k+1, and repeating the steps in the steps 1.1 to 1.4.

When n is the number of coil groups in all the multi-axis stabilization motors, $V_{i,k}$ is the voltage of the coil group i at the time step k, $I_{i,k}$ is the current of the coil group i at the time step k, and $R_{i,k}$ is the resistance of the coil group i at the time step k, main equations in all the resistance calculation modules are as follows:

$$V_k = [V_{1,k}, \cdots, V_{i,k}, \cdots, V_{n,k}] \quad \text{(Equation 1)}$$

$$I_k = [I_{1,k}, \cdots, I_{i,k}, \cdots, I_{n,k}] \quad \text{(Equation 2)}$$

$$R_k = [R_{1,k}, \cdots, R_{i,k}, \cdots, R_{n,k}] \quad \text{(Equation 3)}$$

$$R_{i,k-1} = \frac{V_{i,k-1}}{I_{i,k-1}} \quad \text{(Equation 4)}$$

When $E_{i,k}$ is the counter electromotive force of the coil group i at the time step k, main equations in all the counter electromotive modules are as follows:

$$E_k = [E_{1,k}, \ldots, E_{i,k}, \ldots, E_{n,k}] \quad \text{(Equation 5)}$$

$$E_{i,k-1} = V_{i,k-1} - I_{i,k-1} R_{i,k-1} \quad \text{(Equation 6)}$$

When m is the number of stabilization compensation axes (including a three-axis tilt direction and a two-axis translation direction, but not including a translation direction along an optical axis) in the multi-axis stabilization motor, $\theta_{j,k}$ is a stabilization compensation angle or/and distance of the j axis at the time step k, $F_{i,k}$ is a closed-loop control output to the driving circuit and the coil group i at the time step k, and $a_i$ is a gain of the corresponding coil group i in the closed-loop stabilization control, main equations in all the closed-loop stabilization control modules are as follows:

$$F_k = [F_{1,k}, \ldots, F_{i,k}, \ldots, F_{n,k}] \quad \text{(Equation 7)}$$

$$\theta_k = [\theta_{1,k}, \ldots, \theta_{j,k}, \ldots, \theta_{m,k}] \quad \text{(Equation 8)}$$

$$F_{i,k} = G_i(\theta_k) - a_i E_{i,k-1} \quad \text{(Equation 9)}$$

$G_i(\theta_k)$ in the equation 9 is a function of $\theta_k$, with an effect of an open-loop control output to the driving circuit and the coil group i when calculating the compensation $\theta_k$. $a_i E_{i,k-1}$ in the equation 9 is to add a component of closed-loop control on the basis of the open-close control to achieve the effect of closed-loop control, the characteristics of the stabilization motor are changed, the stabilization performance is improved, and the risk of image blurring caused by resonance is reduced.

An application circuit using the non-sensor type closed-loop stabilization control algorithm is provided, the application circuit comprises a driving circuit, an induced circuit and a multi-axis stabilization motor; the driving circuit outputs a stabilization control instruction according to the non-sensor type closed-loop stabilization control algorithm to drive the corresponding multi-axis stabilization motor; the induced circuit detects all voltages and currents output to the multi-axis stabilization motor by the driving circuit, and outputs the voltages and currents to the non-sensor type closed-loop stabilization control algorithm; and the non-sensor type closed-loop stabilization control algorithm calculates and outputs a closed-loop stabilization control module according to the input stabilization compensation angle and the voltages and currents.

Further, the multi-axis stabilization motor is a voice coil motor or a servo motor, which comprises a plurality of groups of coils and magnets.

Further, the stabilization control output by the closed-loop stabilization control module is the voltage $F_k=V_k$, that is, the voltage is used to drive the multi-axis stabilization motor for stabilization motion.

Further, the stabilization control output by the closed-loop stabilization control module is the current $F_k=I_k$, that is, the current is used to drive the multi-axis stabilization motor for stabilization motion.

Further, the non-sensor type closed-loop stabilization control algorithm stores the output voltage $V_k$ or current $I_k$ of the closed-loop stabilization control module in at least one memory for calculation of the algorithm in a next time step.

Further, the multi-axis stabilization motor is further provided with a spring oscillator system, and a damping ratio of a part of the spring oscillator system in the multi-axis stabilization motor is between 0.4 and 1.4 by adjusting a gain $a_i$ in the closed-loop stabilization control module.

Further, the application circuit is further provided with a control chip, the control chip is further provided with a micro controller, a control circuit, and an induced circuit; the control chip comprises the non-sensor type closed-loop stabilization control algorithm.

Further, the control chip is further provided with an amplifier and an analog-to-digital converter to form an induced circuit.

Further, the control chip is further provided with at least one resistor outside to form at least one induced circuit.

Further, the control chip is further provided with at least one resistor and a capacitor outside to form at least one induced circuit.

The beneficial effects of using the technical solution are as follows:

Firstly, a closed-loop control element can be added in the motor without a sensor, thus achieving the excellent stabilization effect and reducing the risk of image blurring caused by resonance.

Secondly, as there is no need to add an additional sensor in the motor, the stabilization motor and the camera module can be simplified, and the size and cost of the motor and module are reduced.

Thirdly, due to the fact that the micro controller, the driving circuit, the amplifier and the analog-to-digital converter required by the present invention are common in the traditional stabilization control chip, when applying the algorithm and circuit of the present invention, the traditional stabilization control chip can be employed, the external electronic parts and circuits are simplified, and the cost and volume are reduced.

DESCRIPTION OF THE EMBODIMENTS

The content of the present disclosure is further described below with reference to the accompanying drawings and preferred specific embodiments of the present invention. The examples set forth are merely illustrative of the present invention and are not intended to limit the scope of the present invention.

As shown in FIG. 1 to FIG. 5, a non-sensor type closed-loop stabilization control algorithm in an embodiment 1 of the solution comprises a resistance calculation module, a counter electromotive force calculation module, and a closed-loop stabilization control module.

Figure 1:
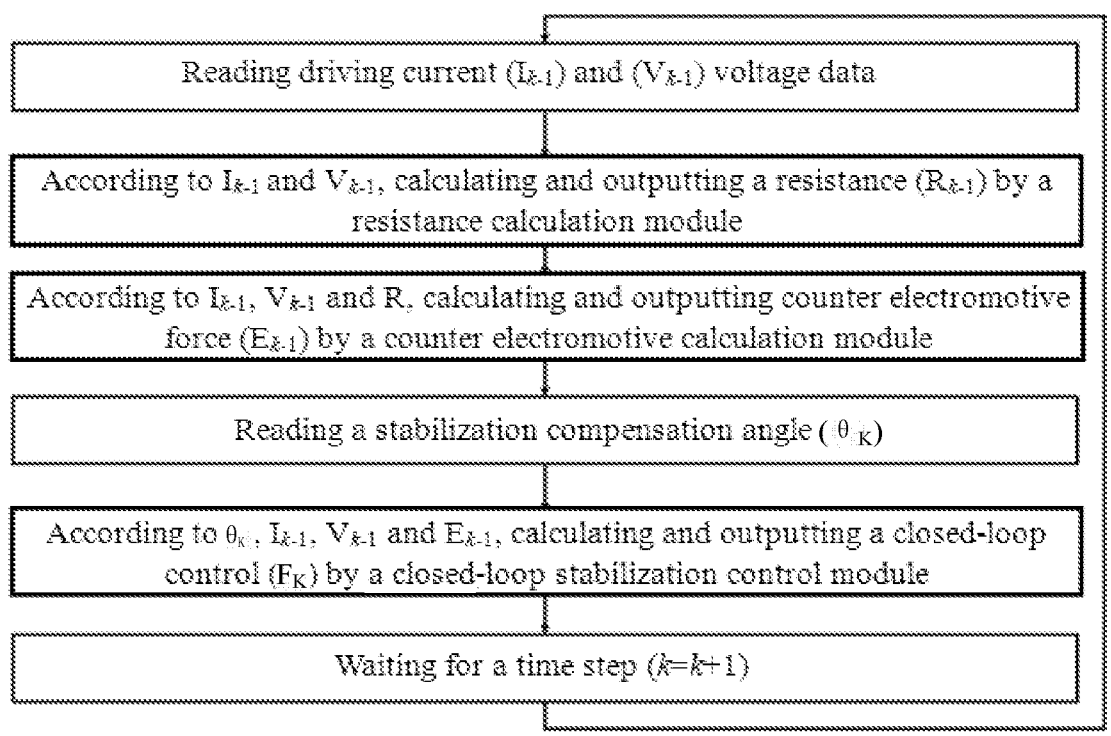
FIG. 1 shows a block diagram of an operation step of the algorithm in accordance with the technical solution.

As shown in FIG. 1, the non-sensor type closed-loop stabilization control algorithm in the embodiment 1 comprises the following steps: reading, by the resistance calculation module, all voltages $V_{k-1}$ and currents $I_{k-1}$ of one multi-axis stabilization motor, and calculating and outputting all coil resistances $R_{k-1}$ in the multi-axis stabilization motor; reading, by the counter electromotive force calculation module, all the resistances, voltages and currents, and calculating and outputting counter electromotive force $E_{k-1}$ of all coils in the multi-axis stabilization motor; reading, by the closed-loop stabilization control module, a stabilization compensation angle or/and distance $\theta_k$, and each coil resistance and the counter electromotive force, and calculating and outputting a closed-loop stabilization control $F_k$; and then waiting for a time step k=k+1, and continuously repeating the steps.

Figure 2:
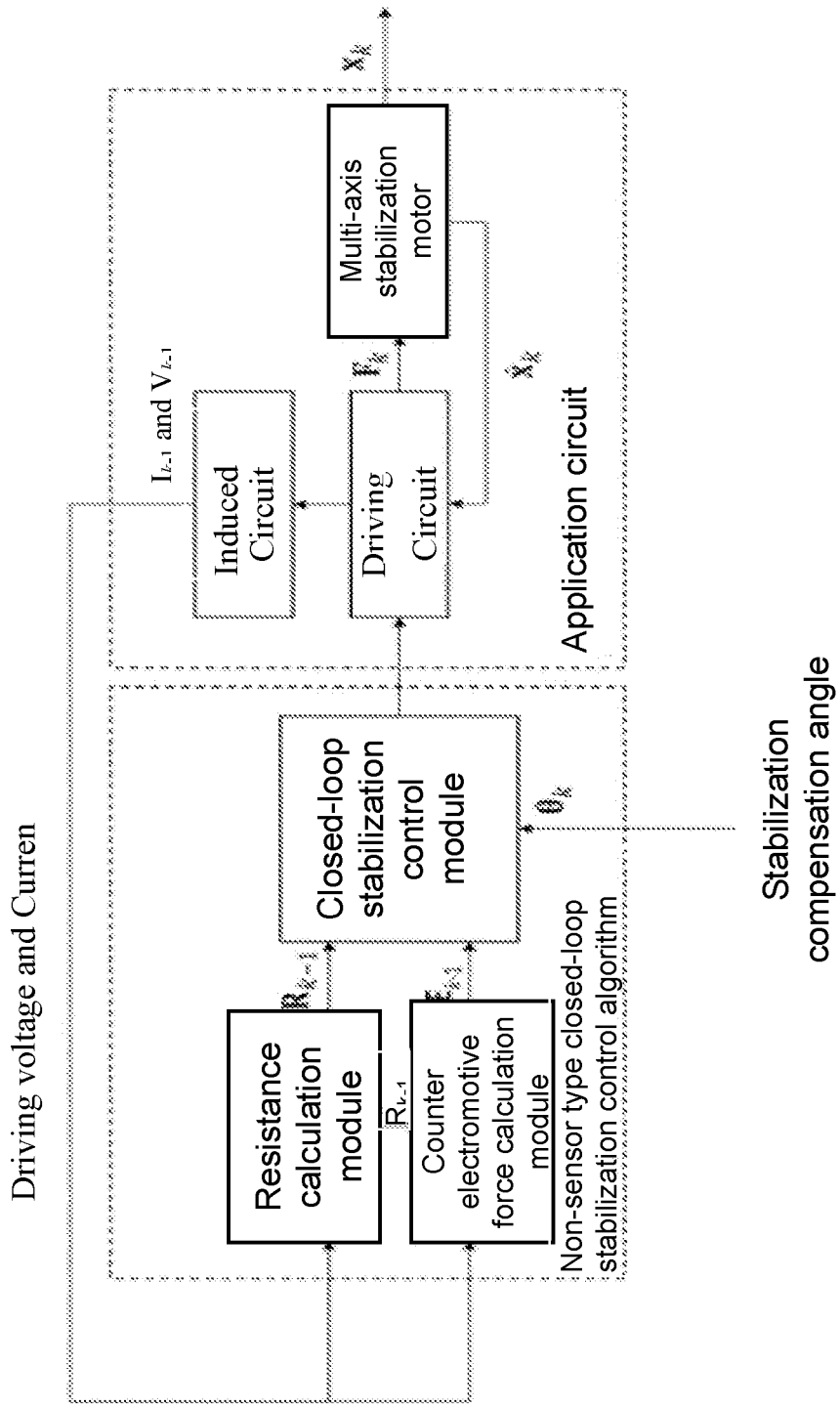
FIG. 2 shows a first application circuit of the algorithm in accordance with the technical solution.

As shown in FIG. 2, the embodiment 1 further comprises an application circuit of the algorithm, which comprises a driving circuit, an induced circuit, and a multi-axis stabilization motor; the driving circuit outputs a stabilization control according to the algorithm to drive the multi-axis stabilization motor; the induced circuit detects all voltages and currents output to the multi-axis stabilization motor by the driving circuit, and outputs the voltages and currents to the algorithm; and the algorithm calculates and outputs the closed-loop stabilization control according to the input stabilization compensation angle and the voltages and currents.

In the embodiment 1, the movement speed $\dot{x}_k$ of a plurality of coils of the multi-axis stabilization motor with respect to the magnets may affect the counter electromotive force $E_k$ in the driving circuit, as well as a relationship between the voltage $V_k$ and the current $I_k$. When the movement speed rises, an absolute value of the counter electromotive force may also increase.

The algorithm and the application circuit in the embodiment 1 can drive the multi-axis stabilization motor for stabilization motion, thus compensating image blurring caused by vibration and improving image definition.

Figure 3:
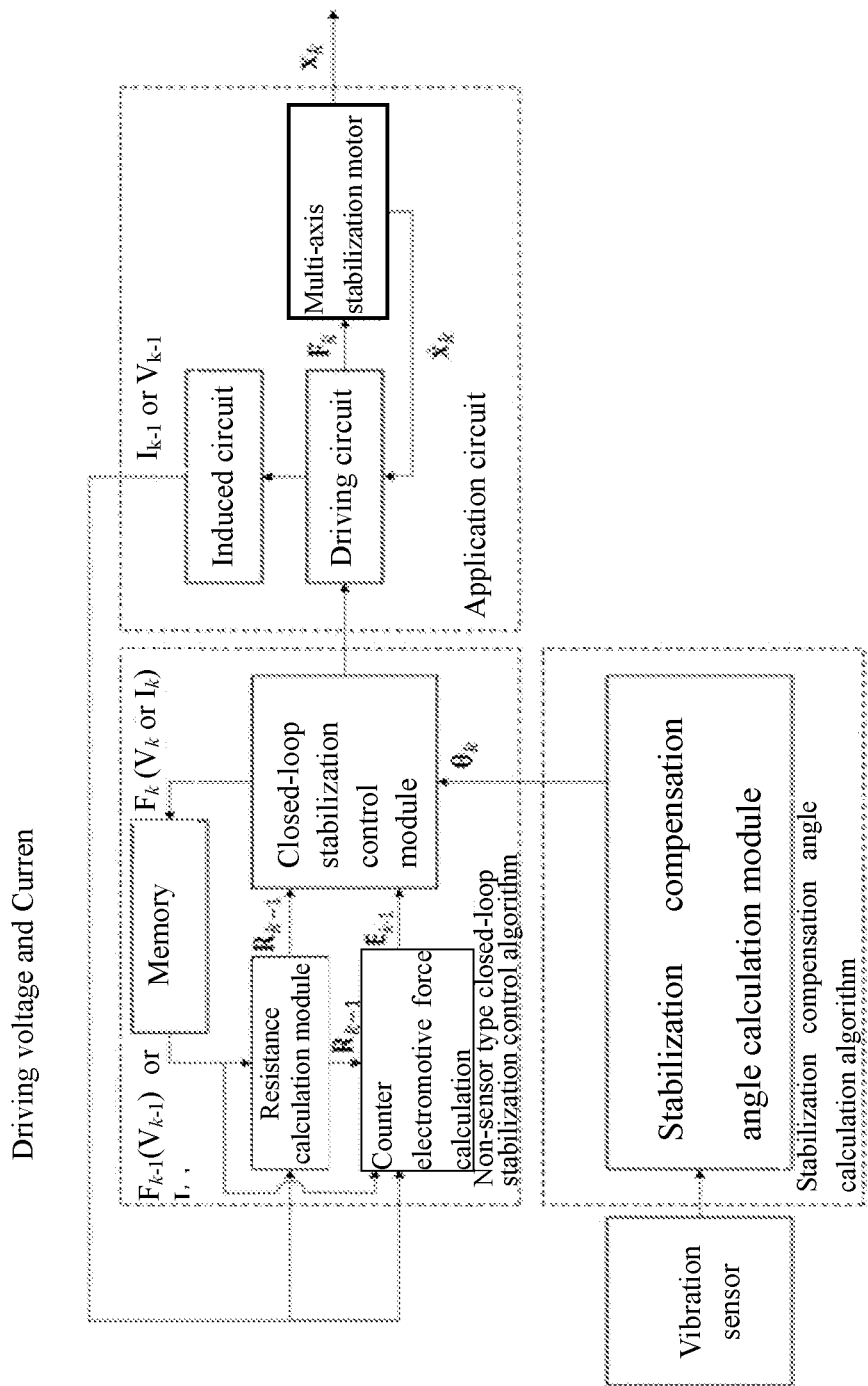
FIG. 3 shows a second application circuit of the algorithm in accordance with the technical solution.

FIG. 3 is a non-sensor type closed-loop stabilization control algorithm in the embodiment 2 of the present invention, and an application circuit thereof. Different from the embodiment 1, a stabilization compensation angle calculation module is added in the embodiment 2 to read a signal of a vibration sensor, calculate a multi-axis stabilization compensation angle and/or distance, and output the multi-axis stabilization compensation angle and/or distance to the closed-loop stabilization control module. Moreover, the non-sensor type closed-loop stabilization control algorithm in the embodiment 2 comprises a memory capable of storing a control signal (current or voltage) of the closed-loop stabilization control module to be used by the resistance calculation module and the counter electromotive force calculation module at a next time step; and there is no need to read a related signal through the induced circuit, thus a more simplified induced circuit is achieved.

Figure 4:
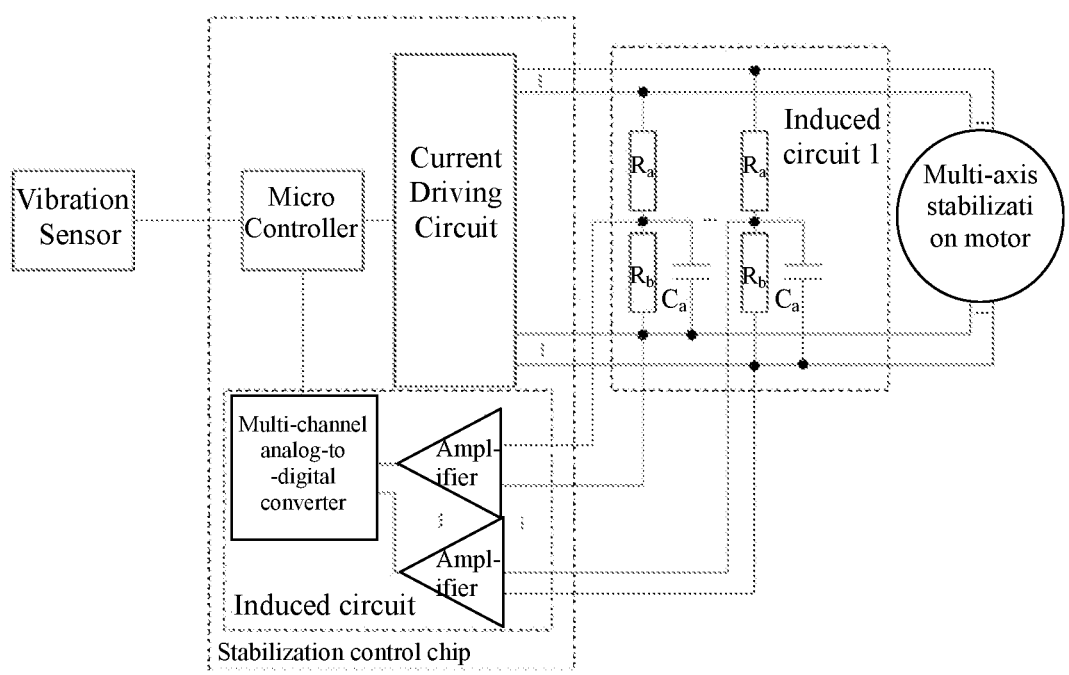
FIG. 4 shows a third application circuit of the algorithm in accordance with the technical solution.

FIG. 4 is an application circuit in an embodiment 3 of the present invention. The application circuit corresponds to an algorithm in the embodiment 2, and comprises a current driving circuit, two induced circuits, a micro controller, a vibration sensor, and a multi-axis stabilization motor; the induced circuit 1 comprises a plurality of resistors and capacitors to form a plurality of low-pass filters which are connected to the output of the current driving circuit to filter out high-frequency noise in the output; the current driving circuit, the induced circuit 1 and the micro controller are integrated into one stabilization control chip; the induced circuit 2 comprises a plurality of amplifiers and a multi-channel analog-to-digital converter;

the input of the induced circuit 2 is connected to the filter in the induced circuit 1 and then output; the output of the induced circuit 2 is connected to the input of the micro controller; the micro controller can read a plurality of output voltages of the current driving circuit through the induced circuits 1 and 2; and through the memory, the micro controller stores the current of the multi-axis stabilization motor at the previous time step; after reading the vibration sensor and performing the stabilization compensation angle calculation algorithm and the non-sensor type closed-loop stabilization control algorithm, the micro controller calculates and outputs a control signal to the current driving circuit, and stores the current in the memory in the micro controller to be used by the two algorithms at the next time step.

Figure 5:
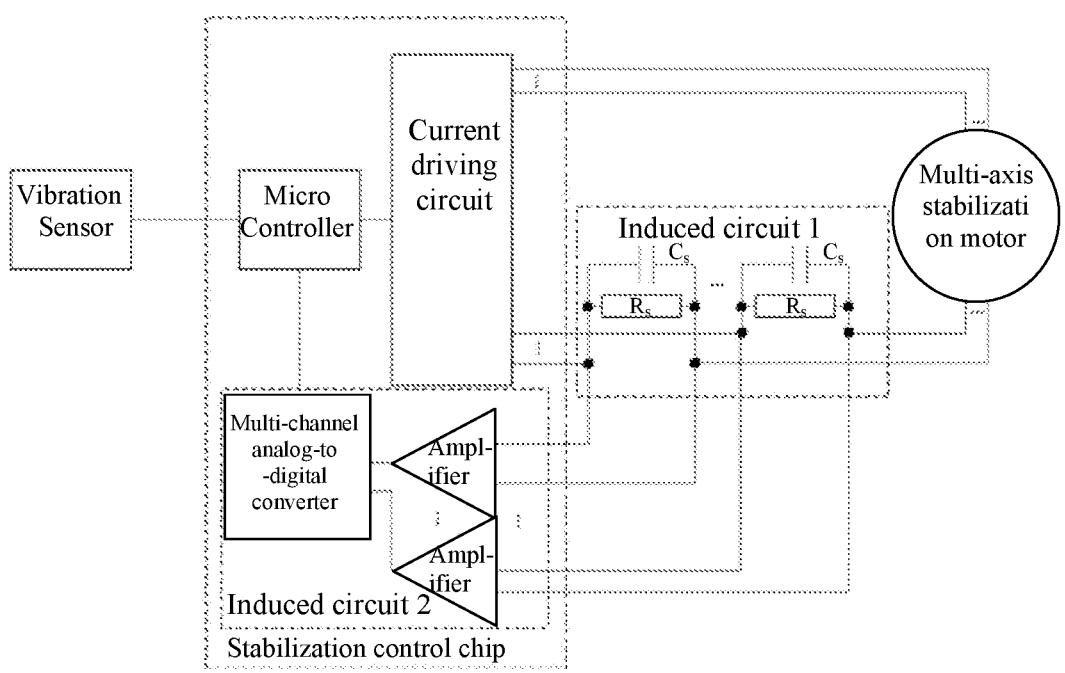
FIG. 5 shows a fourth application circuit of the algorithm in accordance with the technical solution.

FIG. 5 is an application circuit in an embodiment 4 of the present invention, which is similar to the application circuit in the embodiment 3. Except that the embodiment 4 employs a voltage driving circuit, capacitance and resistance combinations of different induced circuits 1, the micro controller reads a plurality of currents of the voltage driving circuit through the induced circuits 1 and 2, and the micro controller calculates and outputs the driving voltage, and stores a related signal in the memory in the micro controller.

As the stabilization control chips in the embodiments 3 and 4 are similar to control chips popular in the market at present, when the algorithms and circuits in the embodiments 3 and 4 are applied, the traditional stabilization control chip can be adopted, external electronic parts and circuits are simplified, and the cost and volume are reduced.

A damping coefficient of a spring oscillator system in the multi-axis stabilization motor can be changed by adjusting $\alpha_i$ (the gain of the corresponding coil group i in the closed-loop stabilization control) of the equation 9 in the non-sensor type closed-loop stabilization control algorithm in the micro processor. The large damping coefficient and damping ration can be achieved by improving $a_i$.

Preferably, when the damping ratio is adjusted to be between 0.4 and 1.4 (Near Critical Damping), the multi-axis stabilization motor can reach an approximate excellent stabilization effect, thus reducing the risk of image blurring caused by the resonance.

As the algorithm and the application circuit thereof in the embodiment do not require an additional sensor in the motor, the motor and the module can be effectively simplified, and the size and cost of the motor and module are reduced.

In other embodiments, relevant resistances in the driving circuit and the induced circuit are added when the coil resistance $R_{k-1}$ is calculated; the number of multi-axis vibration motors or the number of input channels are changed; no control output signal is stored to the memory; the number and combination of the resistance calculation modules, the counter electromotive force calculation modules or the closed-loop stabilization control modules are changed; the number and combination of inducted circuits or driving circuits are changed; the number and combination of analog-to-digital converters, amplifiers and resistors or capacitors in the induced circuit are changed; all capacitors in the induced circuit are removed; and a vibration sensor is also removed, all of which is also within the scope of protection of the present invention.

The foregoing is only preferred exemplary embodiments of the present invention and is not intended to be limiting of the present invention, and any modifications, equivalent substitutions, improvements and the like within the spirit and principles of the present invention are intended to be embraced by the protection range of the present invention.

The invention claimed is:

1. An application circuit using a non-sensor type closed-loop stabilization control algorithm, the application circuit comprising a controller, a driving circuit, an induced circuit and a multi-axis stabilization motor, wherein, the driving circuit outputs an stabilization control instruction according to the non-sensor type closed-loop stabilization control algorithm to drive the multi-axis stabilization motor:

the induced circuit detects all voltages and currents output to for driving the multi-axis stabilization motor by the driving circuit, and outputs all the voltages and currents to the controller, wherein the controller executes the non-sensor type closed- loop stabilization control algorithm to:

step 1, read all the voltages $V_{k-1}$ and currents $I_{k-1}$ through a resistance calculation module;

step 2, calculate and output all coil resistances $R_{k-1}$ of all coils in the multi-axis stabilization motor based on the voltages and currents;

step 3, read all the coil resistances, voltages and currents by a counter electromotive force calculation module, wherein the counter electromotive force calculation module calculates and outputs counter electromotive force $E_{k-1}$ of all the coils in the multi-axis stabilization motor based on the coil resistances, voltages and currents;

step 4, read a stabilization compensation angle $\theta_k$, all the coil resistances and the counter electromotive force through a closed-loop stabilization control module, wherein the closed-loop stabilization control module calculates and outputs a closed-loop stabilization control $F_k$ based on the stabilization compensation angle, all the coil resistances and the counter electromotive force; and step 5, wait for a time step k=k+1, and repeating the steps in the steps 1 to 4, wherein k is an integer.

2. The application circuit of the non-sensor type closed-loop stabilization control algorithm according to claim 1, wherein the multi-axis stabilization motor is a voice coil motor or a servo motor, which comprises a plurality of groups of coils and magnets.

3. The application circuit of the non-sensor type closed-loop stabilization control algorithm according to claim 1, wherein the stabilization control output by the closed-loop stabilization control module is the voltage $F_k=V_k$, that is, the voltage is used to drive the multi-axis stabilization motor to perform stabilization motion.

4. The application circuit of the non-sensor type closed-loop stabilization control algorithm according to claim 1, wherein the stabilization control output by the closed-loop stabilization control module is the current $F_k=I_k$, that is, the current is used to drive the multi-axis stabilization motor to perform stabilization motion.

5. The application circuit of the non-sensor type closed-loop stabilization control algorithm according to claim 1, wherein the non-sensor type closed-loop stabilization control algorithm stores the output voltage $V_k$ or current $I_k$ in the closed-loop stabilization control module in at least one memory for calculation of the algorithm in a next time step.

6. The application circuit of the non-sensor type closed-loop stabilization control algorithm according to claim 1, wherein the multi-axis stabilization motor is further provided with a spring oscillator system, and a damping ratio of a part of the spring oscillator system in the multi-axis stabilization motor is between 0.4 and 1.4 by adjusting a gain $\alpha_i$ in the closed-loop stabilization control module.

7. The application circuit of the non-sensor type closed-loop stabilization control algorithm according to claim 1, wherein the application circuit is further provided with a control chip, the control chip is further provided with a micro controller, a control circuit, and an induced circuit; and the control circuit comprises the non-sensor type closed-loop stabilization control algorithm.

8. The application circuit of the non-sensor type closed-loop stabilization control algorithm according to claim 7, wherein the control chip is further provided with an amplifier and an analog-to-digital converter to form one induced circuit.

9. The application circuit of the non-sensor type closed-loop stabilization control algorithm according to claim 7, wherein the control chip is provided with at least one resistor outside to form at least one induced circuit.

* * * * *